United States Patent
Iwanaga et al.

(10) Patent No.: US 9,058,843 B2
(45) Date of Patent: Jun. 16, 2015

(54) RECOVERY OF DATA WRITTEN BEFORE INITIALIZATION OF FORMAT IN TAPE MEDIA

(71) Applicant: International Business Machines Corporation, Armonk, NY (US)

(72) Inventors: Masayuki Iwanaga, Urayasu (JP); Yumiko Ohta, Yokohama (JP); Yutaka Oishi, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/450,367

(22) Filed: Aug. 4, 2014

(65) Prior Publication Data

US 2015/0055240 A1    Feb. 26, 2015

(30) Foreign Application Priority Data

Aug. 23, 2013   (JP) ................................ 2013-173430

(51) Int. Cl.
| | |
|---|---|
| G11B 5/09 | (2006.01) |
| G11B 5/584 | (2006.01) |
| G06F 13/00 | (2006.01) |
| G11B 20/12 | (2006.01) |
| G11B 20/18 | (2006.01) |

(52) U.S. Cl.
CPC ............ *G11B 20/1201* (2013.01); *G11B 20/18* (2013.01)

(58) Field of Classification Search
CPC .. G11B 19/04; G11B 20/000086; G11B 5/74; G11B 5/70; G11B 17/225; G11B 19/16; G11B 27/34; G11B 5/584; G11B 5/5508; G11B 27/3027; G11B 2290/90; G11B 5/012
USPC .................. 360/60, 134, 92.1, 79, 77.12, 48; 711/111, 113

See application file for complete search history.

(56) References Cited

U.S. PATENT DOCUMENTS

| | | | | |
|---|---|---|---|---|
| 8,665,563 | B2 * | 3/2014 | Hostetter | ....................... 360/134 |
| 2014/0108720 | A1 * | 4/2014 | Abe et al. | ....................... 711/111 |

FOREIGN PATENT DOCUMENTS

JP         H07141835 A    6/1995

* cited by examiner

*Primary Examiner* — Nabil Hindi
(74) *Attorney, Agent, or Firm* — Matthew C. Zehrer (57) ABSTRACT

A tape medium uses a format to store data in which the tape medium is partitioned into an index partition (IP) and a data partition (DP). The latest metadata related to additional data newly added and written to the DP in accordance with the format is updated and stored in the IP. The same metadata is repeatedly written after the updated metadata (e.g. Index #1) in the IP. Alternatively, additional data newly added and written to the DP is stored in memory, and is called from memory and then added and written after metadata (e.g. Index #0) during the formatting. In either manner, data written prior to formatting may be recovered.

17 Claims, 6 Drawing Sheets

RECOVERY OF DATA WRITTEN BEFORE INITIALIZATION OF FORMAT IN TAPE MEDIA

FIELD

Embodiments of the present invention relate to a file system for a storage library. More specifically, embodiments of the present invention relate to a mechanism for accessing data on a tape medium via a Linear Tape File System (LTFS).

DESCRIPTION OF THE RELATED ART

In LTFS, before writing and reading files to and from a tape medium, the tape medium has to be formatted for the LTFS format. The LTFS format was created by IBM Corporation, and the formatting method has been publicly disclosed. IBM Corporation and some other companies implemented file systems to support tape media written in accordance with the LTFS format.

When a tape medium uses the LTFS format, the tape medium is divided into two partitions called an index partition (IP) and a data partition (DP). When a user writes data to a tape medium using LTFS, metadata called an index is written to the tape medium along with the files themselves. The index includes information such as file names and file creation dates. Primarily, the most recent index is written to the IP. The files themselves and an index history are written to the DP.

SUMMARY

In an embodiment of the present invention, a method is disclosed for recovering data written prior to formatting a tape medium using a format for recording data in which the tape medium is partitioned into an index partition (IP) and a data partition (DP). The IP updates and records the latest metadata related to additional data added and writes to the DP in accordance with the format. The method includes writing additional data to the DP, writing to the IP updated metadata related to the additional data written to the DP, repeating the writing of similar metadata to the IP following the updated metadata, and referencing the repeated similar metadata to recover the additional data written to the DP.

In another embodiment of the present invention, a non transitory computer program product is disclosed for recovering data written prior to formatting a tape medium using a format for recording data in which the tape medium is partitioned into an index partition (IP) and a data partition (DP). The IP updates and records the latest metadata related to additional data added and written to the DP in accordance with the format. The computer program product includes program instructions that when executed cause a file system to write additional data to the DP, write to the IP updated metadata related to the additional data written to the DP, repeat the writing of similar metadata to the IP following the updated metadata, and reference the repeated similar metadata to recover the additional data written to the DP.

In yet another embodiment of the present invention, a system is disclosed for recovering data written prior to formatting a tape medium using a format for recording data in which the tape medium is partitioned into an index partition (IP) and a data partition (DP). The IP updates and records the latest metadata related to additional data added and written to the DP in accordance with the format. The system includes a tape drive configured to write data to the tape medium and a file system that controls the tape drive. The file system includes a local memory and is configured to write additional data to the DP, to write to the IP updated metadata related to the additional data written to the DP, to repeat the writing of similar metadata to the IP following the updated metadata, and to reference the repeated similar metadata to recover the additional data written to the DP.

These and other embodiments, features, aspects, and advantages will become better understood with reference to the following description, appended claims, and accompanying drawing.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The drawings are not necessarily to scale. The drawings are merely schematic representations, not intended to portray specific parameters of the invention. The drawings are intended to depict only exemplary embodiments of the invention. In the drawings, like numbering represents like elements.

DETAILED DESCRIPTION

It is an object of various embodiments of the present invention to enable the recovery of files written before formatting even when reformatting has been performed accidentally or inadvertently. As a result, files written before reformatting can be recovered even after initialization has been performed accidentally. In certain embodiments, the latest index is generally written to the IP and again written upon the tape medium to avoid the problem of overwriting the latest index and not being able to reference the index when the tape medium is accidentally reformatted. Also, when a first file is written to the tape medium after the tape medium has been formatted using the LTFS format, the file itself may be stored in memory prior to the file being written. When the LTFS writes the latest index to the IP, the file stored in the memory may be written after the index to avoid the problem of losing the file when the tape medium is accidentally reformatted.

Figure 1:
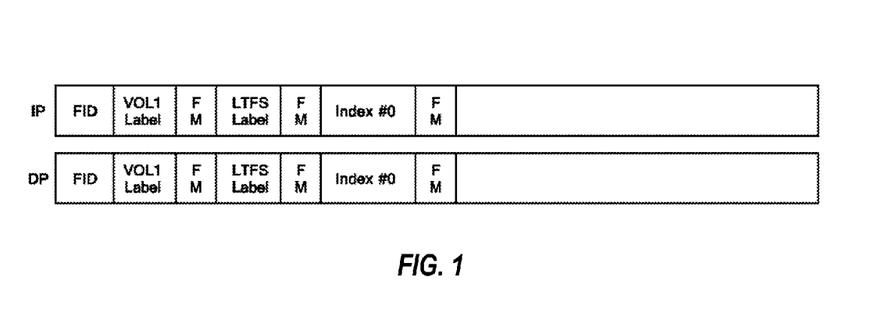
FIG. 1 is a diagram showing the state of a tape medium immediately after LTFS formatting.

FIG. 1 is a diagram showing the state of a tape medium immediately after LTFS formatting. When a tape medium uses the LTFS format, the tape medium first requires initial formatting. A Format Identification Data (FID) set is special data written at the beginning of a tape medium when the tape medium is formatted in a tape drive, and includes information such as the number of partitions on the tape medium and the capacity of each partition.

The VOL1 Label, also called the ANSI Label, is a general format label which is literally stipulated by ANSI. The LTFS Label is a label stipulated by the LTFS format and holds information indicating that the tape medium has been formatted in compliance with a version of the LTFS format. A File Mark (FM) is a type of book mark commonly used in tape media, and is used to seek data.

Index #0 is the index written during formatting. At the formatting stage, the index does not contain file-specific information because there are no files on the tape medium, but is written to hold information such as the volume name of the tape medium.

Figure 2:
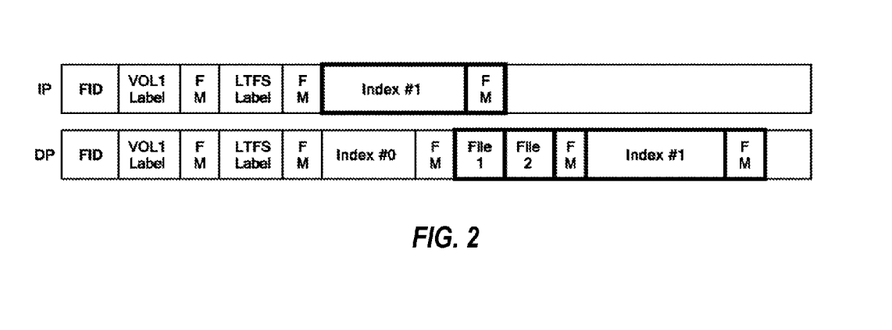
FIG. 2 is a diagram showing the state when File 1 and File 2 have been written to the tape medium after the tape medium has been formatted using the LTFS format.

FIG. 2 is a diagram showing the state when File 1 and File 2 have been written to the tape medium after the tape medium has been formatted using the LTFS format. The portions surrounded by thick solid lines are for added/updated data. The added data of File 1 and File 2 have just been added and written to the DP of the tape medium.

Index #1 includes metadata related to File 1 and File 2. The latest index (latest metadata) is recorded and stored in the IP, but an index history is recorded and stored in the DP.

The timing for updating the index is determined when the file system is implemented. It may be updated at a predetermined time interval, or may be updated only when the tape medium is removed from a tape drive. As the tape medium continues to be used, the index located in the IP is always the latest index. The existing index in the DP is not overwritten, and files and indices are added and written to the DP. In other words, the metadata related to data that has been added and written to the DP is updated and written to the IP.

When data is written to the tape medium by a tape drive, the tape drive executes procedures called error recovery procedures (ERP) if necessary to rewrite the data. This means the length of tape required to write the FM on the far right from the FID in FIG. 1, that is, the data written to the tape medium when the tape medium is formatted using the LTFS format, does not necessarily match.

When the tape drive writes data to the tape medium, the application using the tape drive asks the tape drive to write data in variable-length units called records. On the other hand, when the tape drive actually writes data to the tape medium, it reconfigures and writes the data in fixed-length units with a capacity of several megabytes called data sets (DS). Because the capacity of each label written when the tape medium is formatted using the LTFS format is small enough, up to four DS fit between the FID and the far right FM even when each FM is written as a separate DS. The length of a DS when written under ideal conditions depends on the generation of the tape medium, but is approximately 10 cm.

The DS distance (the distance from the end of one DS to the end of the next DS) fits within 4 m even when ERP occurs, but the DS distance is defined by the LTO standards which utilize LTFS, and by IBM Enterprise Tape Drive TS1140 standards.

Thus, only the latest metadata related to data added and written to the DP according to the format is recorded in the IP. However, caution must be exercised so that a tape medium already using LTFS is not inadvertently or accidentally reformatted by a user using the LTFS format in accordance with these formatting characteristics.

Figure 3:
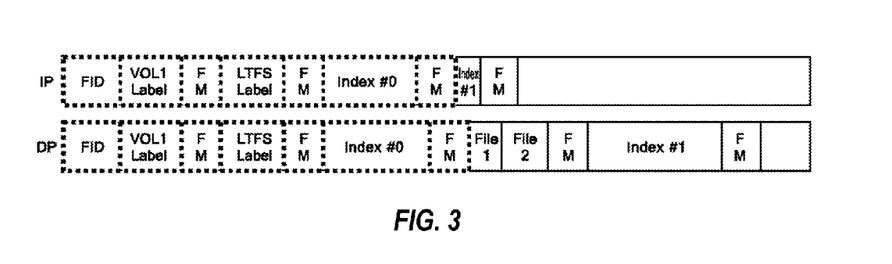
FIG. 3 is a diagram showing the state when the data surrounded by the thick dotted lines has been written again to the tape medium after the tape medium has been reformatted using the LTFS format.

FIG. 3 is a diagram showing the state when the data surrounded by the thick dotted lines has been written again to the tape medium after the tape medium has been reformatted using the LTFS format. The latest index in the IP is overwritten in accordance with the formatting of the LTFS format.

The latest index remains at the end of the DP but because, as mentioned above, the length of the tape medium required to write the data from the FID to the FM to the right of Index #0 changes depending on the frequency with which ERP occurs during data writing, the files themselves beginning at the start of File 1 are overwritten in accordance with the formatting of the LTFS format, and it may not be possible to recover the files even when user is conscious that the formatting was performed accidentally or inadvertently.

When the tape drive writes data by its very nature to a partition, it cannot read data that has already been written to the rear of a spot at which the data is written to the partition (to the right in the drawing). However, this data can be read if special data recovery firmware is used. Therefore, when reformatting is accidentally performed, the only data that cannot be recovered using special data recovery firmware is the data that has been physically overwritten during formatting.

Figure 4:
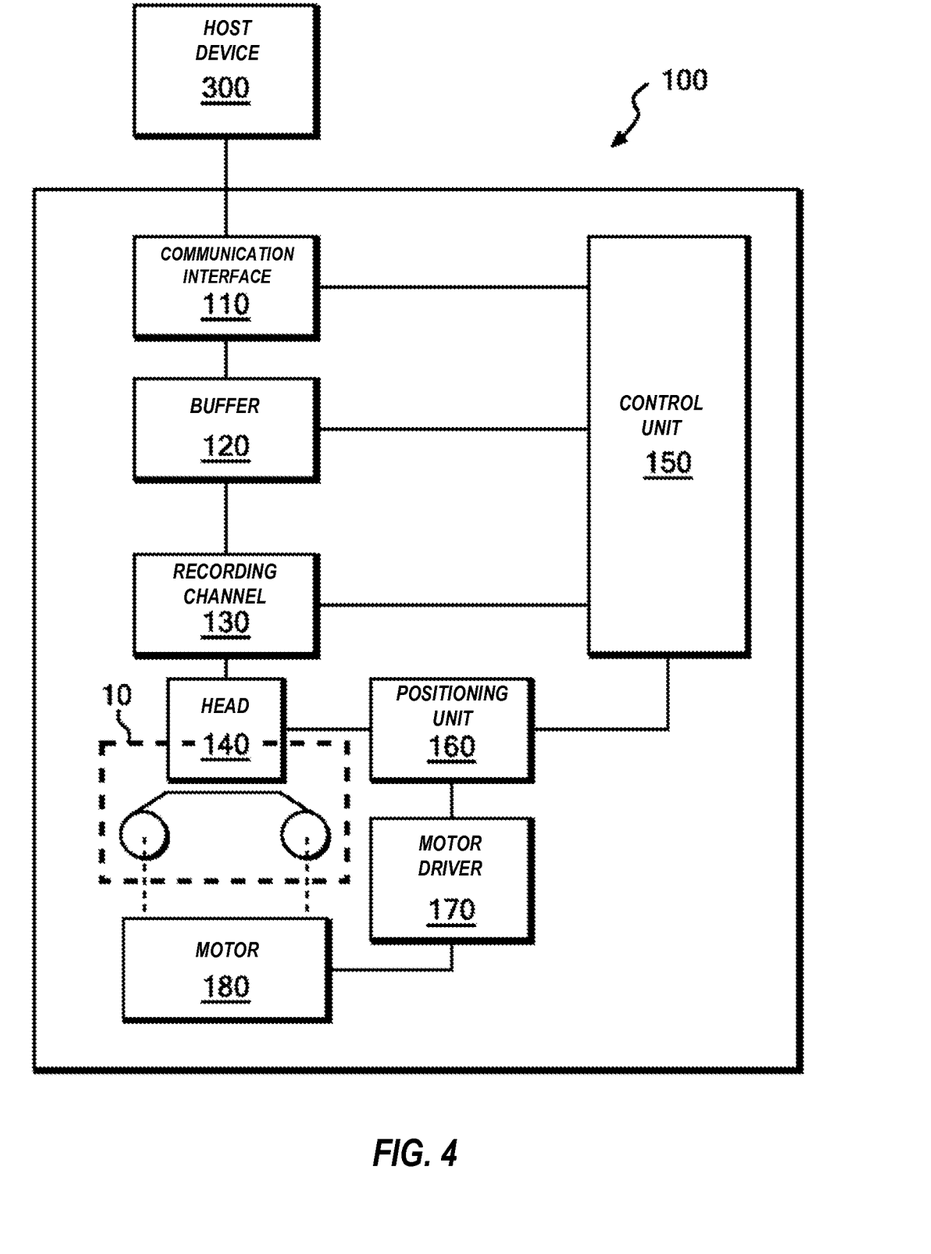
FIG. 4 is a diagram showing an example of a hardware configuration for a tape drive (tape storage device) using the present invention.

FIG. 4 is a diagram showing an example of a hardware configuration for a tape drive (tape storage device) using embodiments of the present invention. The tape drive 100 may utilize an LTFS configuration and may include a communication interface (I/F) 110, a buffer 120, a recording channel 130, a read/write head 140, a control unit 150, a positioning unit 160, a motor driver 170, and/or a motor 180. The tape drive 100 may write/read data to/from a tape medium 10 in DS units constructed from records sent by a host 300.

The communication interface (I/F) 110 communicates with a host device 300 via a network. The communication interface (I/F) 110 may generally receive write commands from the host device 300 instructing the tape drive to write data to a tape medium 10. The communication interface (I/F) 110 may also receive read commands from the host device 300 instructing the tape drive to read data from the tape medium 10. The communication interface (I/F) 110 may have a function for compressing write data and decompressing compressed read data for increasing the storage capacity of the tape medium.

The buffer 120 may be a memory used to store data to be written to a tape medium 10 or data read from a tape medium 10 (for example, prior to formatting). For example, DRAM memory is commonly used for general storage. The recording channel 130 is generally a communication route that may be used to write data stored in the buffer 120 to the tape medium 10 or temporarily to store data read (called) from the tape medium 10 in the buffer 120. The read/write head 140 may include an element for reading data and an element for writing data. The positioning unit 160 uses the motor driver 170 to operate the motor 180 and wind the tape in the longitudinal direction (forward and reverse in the write direction of the data). The positioning unit 160 moves the read/write head 140 in the width direction of the tape over the tape medium 10. The tape medium 10 includes tape and reels for winding the tape. The tape moves in the longitudinal direction as the reels rotate to, for example, add and write data. The control unit 150 controls the entire tape drive 100.

Figure 5A:
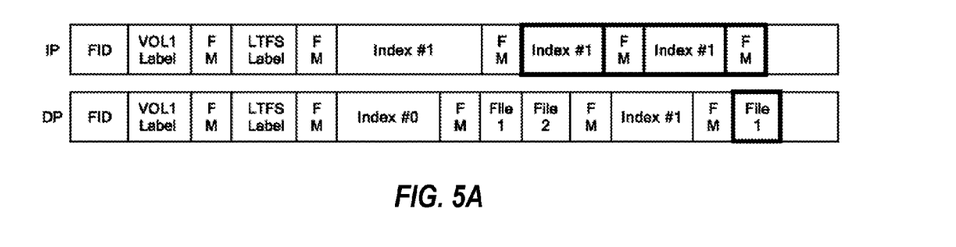
FIG. 5A-FIG. 5B is a diagram showing the state when the data surrounded by the thick solid lines has been written again to the tape medium using the present invention.
Figure 5B:
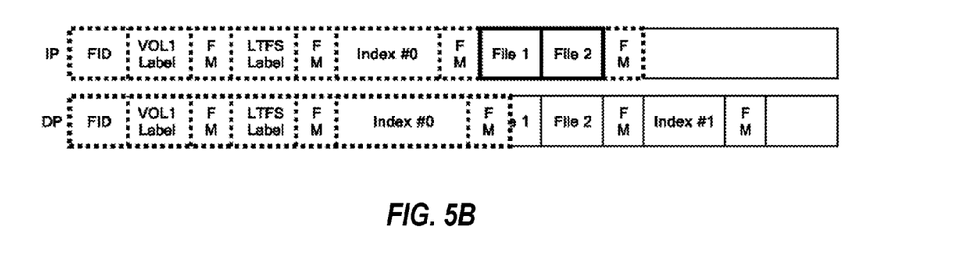

FIG. 5A and FIG. 5B are diagrams showing the state when the data surrounded by the thick solid lines has been written again to the tape medium using embodiments of the present invention. As shown in FIG. 5A, the same updated metadata (Index #1) is added and written to the IP as added data following the updated metadata (Index #1). In other words, the same index is written twice. For example, after the updated index has been written to the IP, the updated index is written again. Such writing operation may be performed two or more times.

As shown in FIG. 5B, file data (File 1 and File 2) stored in the memory (buffer 120) may be written after the updated index has been written to the IP when the file system using the LTFS format has been implemented and, for example, the tape medium is unloaded. Copies of the files (File 1 and File 2) always overwritten at the end of the partition during formatting may be stored in order to be able to recover files written prior to formatting even when reformatting is performed accidentally or inadvertently. When files overwritten during formatting are to be written and the files overwritten by formatting exist when the tape medium is loaded, the files may be read from the tape medium by the LTFS if necessary and stored in the memory used by the LTFS. The equations used to determine the files that would be overwritten during formatting are described below.

Figure 6:
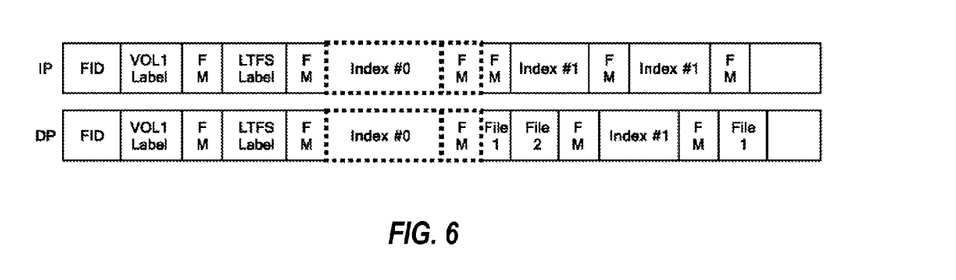
FIG. 6 is a diagram showing the state when the data surrounded by the thick solid lines has been written again to the tape medium using the present invention after the data has been written to the tape medium and the tape medium has been reformatted using the LTFS format.

FIG. 6 is a diagram showing the state when the data surrounded by the thick dotted lines has been written again to the tape medium using the embodiments of the present invention, after the data has been written to the tape medium and the tape medium has been reformatted using the LTFS format. The data surrounded by the thick dotted lines is written to a tape medium when the tape medium is reformatted using the LTFS format. The latest index in the IP is overwritten by Index #0 in accordance with the formatting of the LTFS format. However, because the metadata (Index #1) was repeatedly rewritten, it can be referenced after the reformatting, and data recently added to the DP can be recovered.

Figure 7:
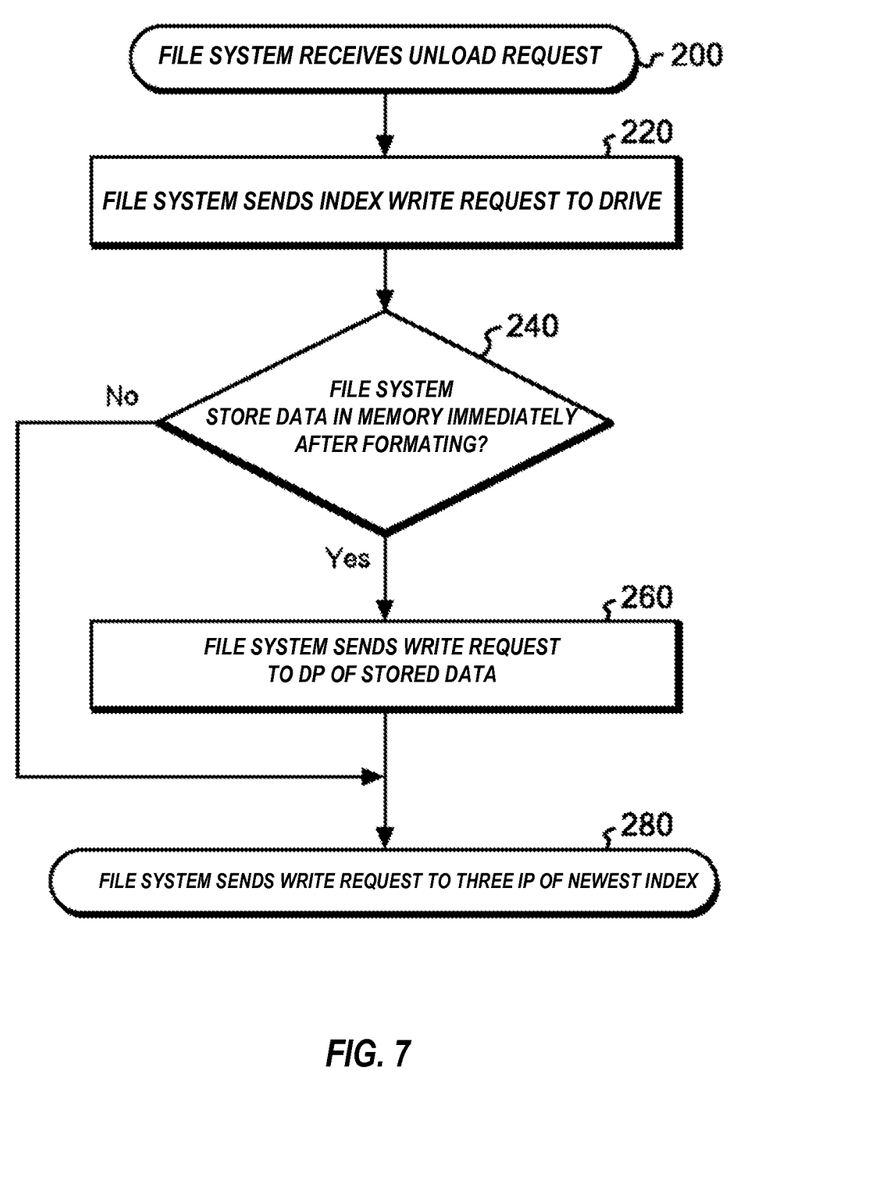
FIG. 7 is a first flowchart showing steps in the present invention.

FIG. 7 is a first flowchart depicting an embodiment of the present invention. The first flowchart begins with the file system (e.g. LTFS, etc) receiving an unload request (block 200) and continues with the file system sending an index write request to the drive (e.g. tape drive) (block 220). If the file system stores data in the memory immediately after forming, the file system sends s write request to DP (block 260). With regard to the case of "NO" at conditional block 240 which asks whether or not data was stored by the LTFS in the memory immediately after formatting, may occur in cases in which the files themselves have not been changed, only the index or metadata for the files such as file access times, etc. Finally, the file system sends the write request e.g. to three IP of newest index (block 28).

The process performed to format a tape medium using the LTFS is generally known in the art. When files are to be written for the first time, the file data is stored in the memory, and this is written after the index when the tape medium is unloaded. This allows problems to be avoided such as losing files stored before formatting, even when reformatting is performed accidentally using the LTFS format. As mentioned earlier, up to four DS are written during formatting. Because the maximum distance between DS is 4 m, X amount of data stored in the memory can be sought to be written to tape using the following equation.

Here, L [m] is the ideal DS length (when rewriting has not occurred), and C [byte] is the capacity of each DS.

$$X \text{[byte]} = (4\,[m] - L\,[m])*4/L\,[m]*C\,\text{[byte]}$$

In order to protect the information in the latest index recorded in the IP, the same index is written twice after the index in the IP. By increasing the redundancy, the latest index can be referenced by accessing the second or third index even when the tape medium has been reformatted accidentally or inadvertently using the LTFS format.

Figure 8:
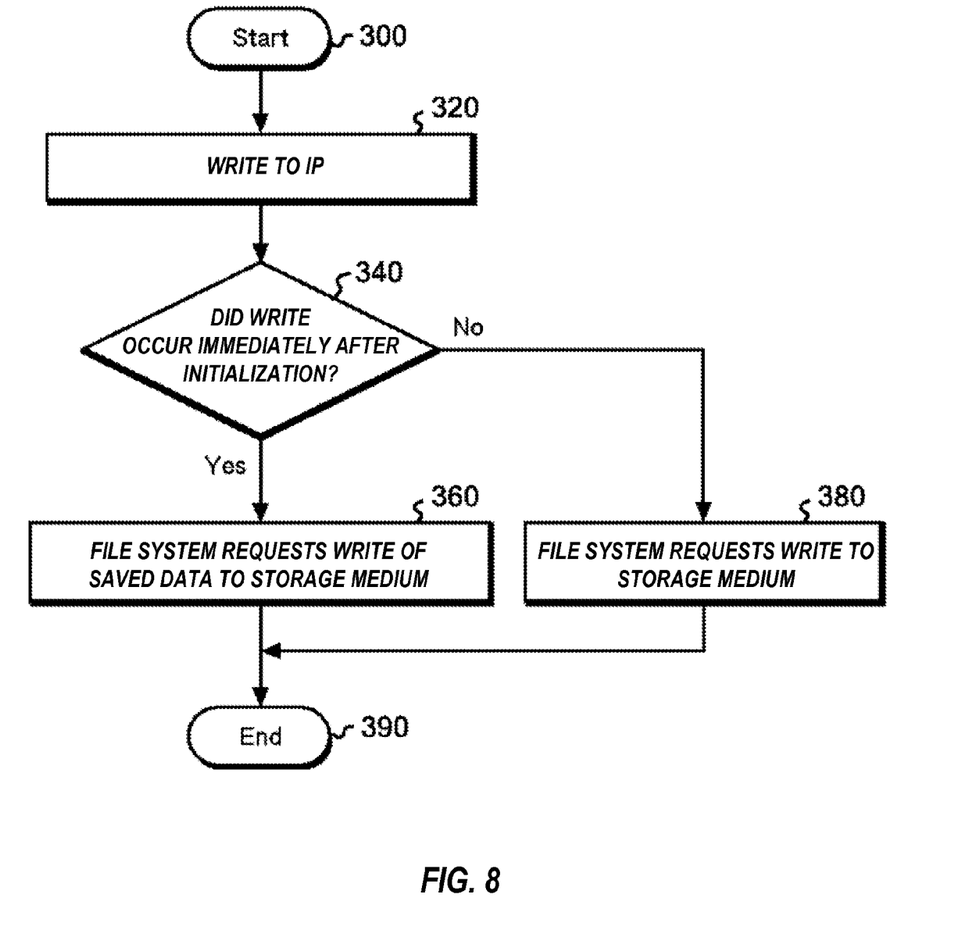
FIG. 8 is a second flowchart showing steps in the present invention.

FIG. 8 is a second flowchart depicting an embodiment of the present invention. Such embodiment begins at block 300 and continues with the file system writing to the IP (block 320). If the write occurred immediately after initialization (block 340), the file system requests the writing of saved data to the tape medium (block 360). If the write did not occur immediately after initialization (block 340), the file system requests the writing of the data to the tape medium (block 380). Such embodiment ends at block 390.

The tape medium is formatted after additional data to be written to the DP for the first time has been stored in the memory. The additional data to be written to the DP for the first time is called from the memory and written to the tape medium after the metadata in the IP has been updated by the formatting. The data written after the index in the IP is located within the maximum length in which overwriting may occur during formatting.

The number of blocks M that have to be saved can be determined using the following equation, where X [m] is the maximum length written during formatting, d [m] is the minimum distance between adjacent DS (more precisely, the distance from the end of one DS to the end of the adjacent DS), and K [block] is the maximum number of blocks included in a single DS.

$$M\,\text{[block]} = K\,\text{[block]} \times [X\,[m]/d\,[m]]$$

In other words, it is possible to ensure that no data will be deleted by formatting if M [block] is saved.

The adverse effect of the data written after the index in the IP on the capacity of the IP can be avoided in the present invention by overwriting the data during an IP index update when a file is written to the tape medium.

Figure 9:
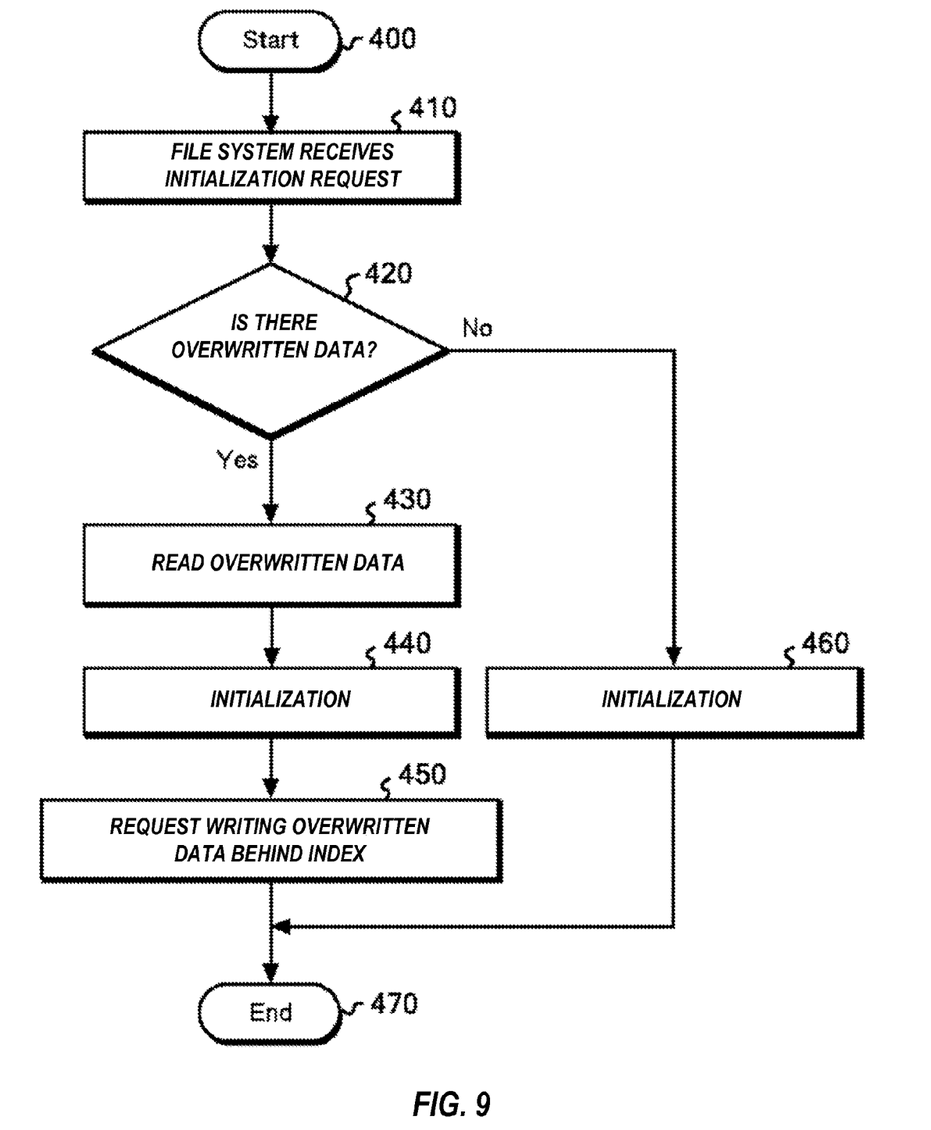
FIG. 9 is a third flowchart showing steps in the present invention.

FIG. 9 is a third flowchart depicting an embodiment of the present invention. Such embodiment begins at block 400 and continues with the file system receiving an initialization request (block 410). If there is no overwritten data (block 420) the initialization begins (block 460). If there is overwritten data (block 420), the overwritten data is read (block 430), initialization begins (block 440), and the file system requests the writing of overwritten data behind an index (block 450). Such embodiment ends at block 470.

The time required to perform LTFS initialization is approximately 60 seconds, and the time required to write saved data is approximately 2 seconds. Therefore, writing saved data during initialization requires about 3% of the processing time. In other words, it has very little effect on the processing time. The processing time can be reduced by deleting from the saved data in the M [block] any deleted data and any past indices that are no longer needed to restore data.

The embodiments of the present invention can be used advantageously, not only during formatting using the LTFS format, but also when an erase command is executed at the beginning of a tape medium. The embodiments of the present invention can be implemented not only as a method, but also as a program implementing the method, a system executing the method, and a tape medium using the method to record data.

The invention claimed is:

1. A method for recovering data written prior to formatting a tape medium using a format for recording data in which the tape medium is partitioned into an index partition (IP) and a data partition (DP), the IP updating and recording the latest metadata related to additional data added and written to the DP in accordance with the format, the method comprising:
- writing additional data to the DP;
- writing to the IP updated metadata related to the additional data written to the DP;
- repeating the writing of similar metadata to the IP following the updated metadata;
- formatting the tape medium, wherein the updated metadata is overwritten in the formatting; and
- referencing the repeated similar metadata to recover the additional data written to the DP.

2. The method according to claim 1, further comprising:
- storing in memory the additional data written to the DP;
- calling from the memory the additional data written to the DP and writing the additional data in the IP subsequent to the updated metadata being overwritten; and
- recovering the additional data newly written to the DP.

3. The method according to claim 1, wherein recovering the additional data written to the DP is performed by error recovery procedures (ERP).

4. The method according to claim 1, wherein the writing of similar metadata to the IP following the updated metadata is performed is repeated two or more instances.

5. The method according to claim 1, wherein the IP comprises file name data and file creation date of the additional data written to the DP.

6. The method according to claim 1, wherein the DP comprises file data and IP index history.

7. A non transitory computer program product for recovering data written prior to formatting a tape medium using a format for recording data in which the tape medium is partitioned into an index partition (IP) and a data partition (DP), the IP updating and recording the latest metadata related to additional data added and written to the DP in accordance with the format, the computer program product comprising program instructions that when executed cause a file system to:
- write additional data to the DP;
- write to the IP updated metadata related to the additional data written to the DP;
- repeat the writing of similar metadata to the IP following the updated metadata;
- format the tape medium, wherein the updated metadata is overwritten in the formatting, and;
- reference the repeated similar metadata to recover the additional data written to the DP.

8. The computer program product according to claim 7, wherein the program instructions further cause the file system to:
- store in local memory the additional data written to the DP;
- call from the local memory the additional data written to the DP and write the additional data in the IP subsequent to the updated metadata being overwritten; and
- recover the additional data newly written to the DP.

9. The computer program product according to claim 7, wherein the recovery of the additional data written to the DP is performed by error recovery procedures (ERP).

10. The computer program product according to claim 7, wherein the writing of similar metadata to the IP following the updated metadata is performed is repeated two or more instances.

11. The computer program product according to claim 7, wherein the IP comprises file name data and file creation date of the additional data written to the DP.

12. The computer program product according to claim 7, wherein the DP comprises file data and IP index history.

13. A system for recovering data written prior to formatting a tape medium using a format for recording data in which the tape medium is partitioned into an index partition (IP) and a data partition (DP), the IP updating and recording the latest metadata related to additional data added and written to the DP in accordance with the format, the system comprising:
- a tape drive configured to write data to the tape medium;
- a file system that controls the tape drive, the file system comprising a local memory and configured to write the additional data to the DP, to write to the IP updated metadata related to the additional data written to the DP, to repeat the writing of similar metadata to the IP following the updated metadata, to format the tape medium, wherein the updated metadata is overwritten in the formatting, and to reference the repeated similar metadata to recover the additional data written to the DP.

14. The system according to claim 13, wherein the file system is further configured to store in local memory the additional data written to the DP, to call from the local memory the additional data written to the DP and write the additional data in the IP subsequent to the updated metadata being overwritten, and to recover the additional data newly written to the DP.

15. The system according to claim 13, wherein the recovery of the additional data written to the DP is performed by error recovery procedures (ERP).

16. The system according to claim 13, wherein the writing of similar metadata to the IP following the updated metadata is performed is repeated two or more instances.

17. The system according to claim 13, wherein the IP comprises file name data and file creation date of the additional data written to the DP and wherein the DP comprises file data and IP index history.

* * * * *